United States Patent [19]

Puyplat

[11] 3,999,058
[45] Dec. 21, 1976

[54] MOTOR VEHICLE HEADLAMP SYSTEM

[75] Inventor: Olivier Puyplat, Paris, France

[73] Assignee: Cibie Projecteurs, Bobigny, France

[22] Filed: June 25, 1975

[21] Appl. No.: 595,009

[30] Foreign Application Priority Data
July 3, 1974 France .............................. 74.23112

[52] U.S. Cl. .......................... 240/62 R; 240/7.1 A; 240/61.9; 240/62.4
[51] Int. Cl.² ...................... B60Q 1/12; B60Q 1/06
[58] Field of Search ............. 240/62 R, 62 B, 62.4, 240/61.2, 61.6, 61.9, 8.25, 7.1 A

[56] References Cited
UNITED STATES PATENTS

| 1,991,101 | 2/1935 | Kennelly | 240/61.9 |
| 2,572,439 | 10/1951 | Brozier | 240/61.9 |
| 2,820,925 | 1/1958 | Schmidt, Jr. | 240/62.4 |
| 3,614,416 | 10/1971 | Fleury | 240/62 R |
| 3,644,728 | 2/1972 | Hessemer et al. | 240/61.9 |
| 3,894,227 | 7/1975 | Pitkjaan et al. | 240/7.1 A |

Primary Examiner—Stephen J. Tomsky
Attorney, Agent, or Firm—Alan H. Levine

[57] ABSTRACT

A motor vehicle headlamp system has an adjusting mechanism which causes the dipped beam briefly to be raised and deflected sideways, to improve vision, when the main beam is extinguished.

11 Claims, 5 Drawing Figures

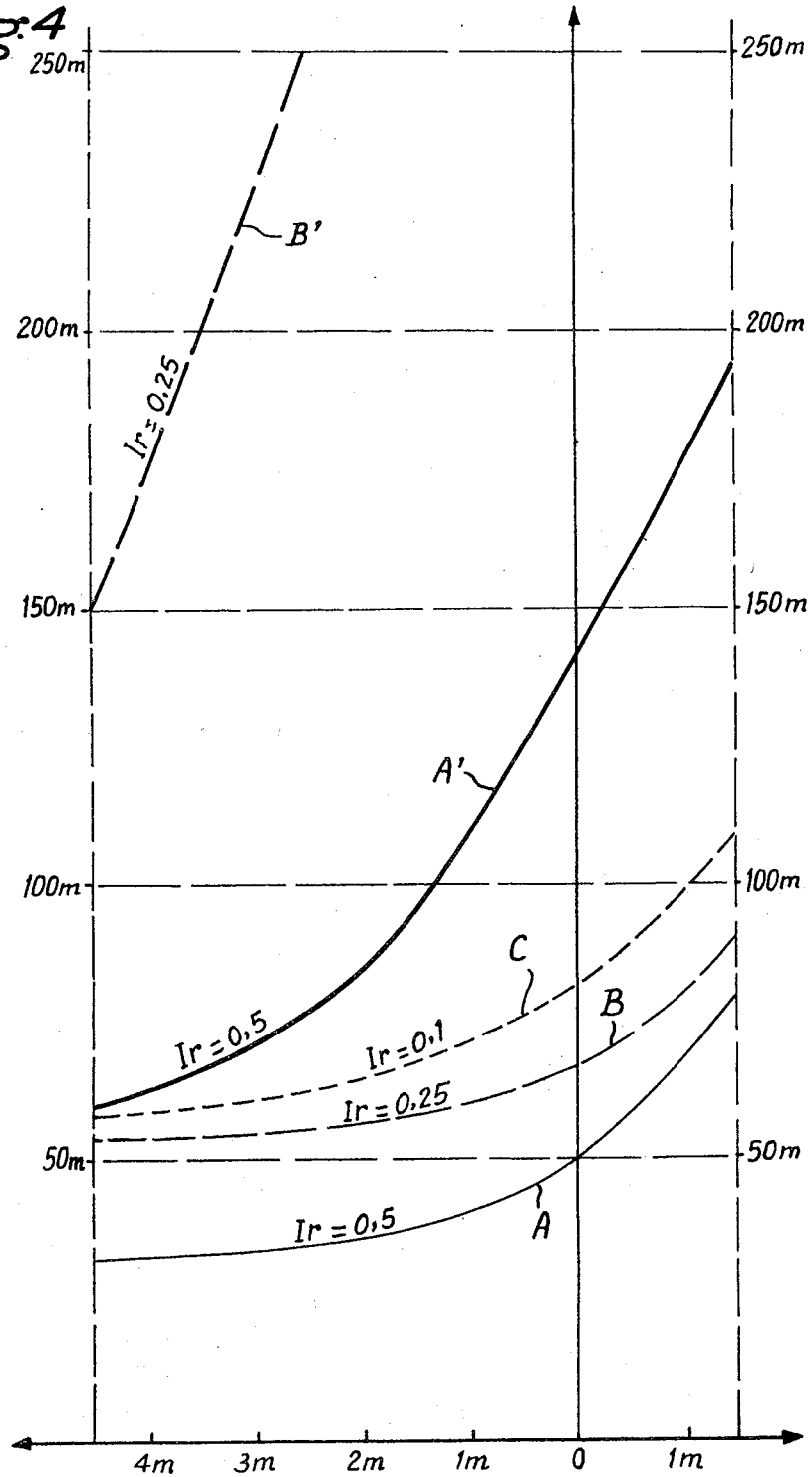

MOTOR VEHICLE HEADLAMP SYSTEM

BACKGROUND OF THE INVENTION

This invention relates to motor vehicle lighting adjustment systems.

Every motor vehicle has a headlamp system adapted to provide at least two different forms of lighting — a long-range or "main" beam and a medium-range or "dipped" beam.

The main beam is designed to give maximum-intensity lighting of the road a considerable distance ahead of the vehicle, whereas the dipped beam is the result of a compromise between the desire to see as far as possible and the need not to dazzle the drivers of oncoming vehicles. Conventionally, the dipped-beam adjustment is such that beam cut-off has a 0.01 radian dip, corresponding to 35 minutes of an angle, below the horizontal — i.e., a dip of 25 cm in 25 m. On the assumption that the headlamps producing the dipped beam are 75 cm above ground level, the theoretical range of the beam would be 75 meters on the left of the vehicle and the order of 100 meters on the right (there being a lateral as well as a downward tilt of the beam). In practice, the actual visibility range provided by halogen bulb headlamps is from 70 to 80 meters on the right and from 40 to 50 meters on the left.

However, when a driver changes from main beam to dipped beam illumination, for instance, when passing another oncoming vehicle, the abrupt and considerable reduction in illumination of the road from 50 to 150 meters ahead of the vehicle causes the driver to see a black patch which at least for a few seconds greatly reduces the range of visibility normally afforded on dipped-beam illumination; the changeover from main beam to dipped beam illumination causes a four-fold reduction in illumination of the road 70 meters ahead of the vehicle and, because of persistence of vision effect in the driver, causes a doubtlessly brief but nevertheless very considerable reduction in the maximum range of visibility.

A reduction in visibility of this nature is of course likely to cause accidents since the driver has no chance of avoiding a hazard seen too late. It also greatly disturbs driving convenience.

SUMMARY OF THE INVENTION

The invention relates to an adjusting system which helps to obviate the disadvantage of the black patch or black spot and accordingly provides an intermediate mode of lighting which helps to reduce the abruptness of the cange from main-beam to dipped-beam lighting.

According to the present invention the system includes main and dipped beam light sources and actuating means controlled by extinction of the main beam and adapted physically to modify briefly the normal position of the dipped beam source by slightly raising the optical axis thereof relatively to the horizontal.

In the case where traffic drives on the right of the road the beam may additionally be shifted to the driver's left. For traffic driving on the left, the rotation of the headlamp axis becomes of course a right-hand rotation. Throughout the following description the case of right-hand drive will be considered so as to simplify the description, the skilled addressee being familiar with the changes necessary for driving on the left of the road.

The upwards and leftwards shift of the headlamp axis shifts the intense-illumination zone of the beam from the headlamp further ahead on the path of the vehicle. The changeover provided by this form of intermediate lighting reduces the abruptness of the change from main-beam to dipped-beam lighting so that the driver can adapt his vision to dipped-beam lighting conditions.

Preferably the dipped beam light source is mounted in a headlamp which can pivot on a vehicle body around a non-vertical axis, and the actuating means comprises a drive adapted to move the headlamp slightly around such axis, and a delay facility which is brought into operation by extinction of the main beam to operate the drive briefly.

Advantageously, the drive has a travel such that the movement of the associated headlamp corresponds to an approximately 0.01 radian reduction of the inclination of its optical axis relatively to the horizontal.

DESCRIPTION OF THE DRAWINGS

The invention may be carried into practice in various ways but two specific embodiments will now be described by way of example with reference to the accompanying drawings, wherein:

FIG. 4 shows the curves of dipped-beam/main-beam intensity isoratios as conventionally provided and as provided according to the invention.

DESCRIPTION OF PREFERRED EMBODIMENTS

Figure 1:
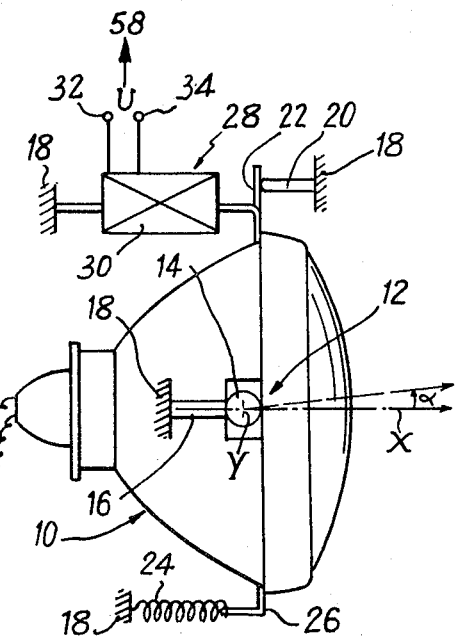
FIG. 1 is a diagrammatic view in elevation of a motor vehicle headlamp having a first embodiment of an adjusting mechanism according to the invention.

In FIG. 1 a motor vehicle headlamp 10 is of a dind which can produce a medium-range or "dipped" beam. The headlamp 10 may also be capable of producing a long-range or "main" beam. In the latter case the motor vehicle (not shown) may have just two headlamps, as 10, each adapted to provide two different forms of lighting. If the headlamp 10 can provide only a dipped beam, the vehicle must of course have, in addition to the two dipped-beam headlamps, as 10, two long-range headlamps for forming the main beam. The adjusting system according to the invention to be described hereinafter is of use equally with either of the systems just described.

The headlamp 10, which will therefore be assumed to be capable of forming at least the dipped beam, is adapted to be adjustably mounted on the vehicle body by any appropriate known means. So that the adjusting system according to the invention may be used without extensive modifications, the mounting means must be able to provide a preferably adjustable normal position of the headlamp on the vehicle and must also permit the headlamp optical axis X to be raised slightly horizontally (and possibly skewed) from the normal position.

In the embodiment shown diagrammatically the headlamp mounting means mainly comprise two symmetrical support and pivot systems 12 It is sufficient for an understanding of this description to say that each system 12 comprises a pivot pin or journal or the like 14 which is rigidly secured to the headlamp 10 and which is mounted for pivoting around an axis Y on a support member 16 adjustably mounted on a vehicle body 18. The angular position of headlamp 10 around the common pivot axis Y of the journals 14 is normally determined by an abutment or stop, as 20, which is adjustably secured to body 18 and which is adapted to be abutted by a lug or the like 22 secured to the headlamp 10. Restoring means, such as a spring 24 provided between the body 18 and a lug 26 rigidly secured to headlamp 10, are provided to maintain the headlamp in its normal position as defined by cooperation between the elements 22 and 20.

As previously stated, all the means for mounting the headlamp 10 on the vehicle body 18, namely the two support and pivot facilities 12 and the abutment 20, are so devised that the headlamp optical axis X can pivot around the pivot axis Y in the sense of the axis X rising relatively to the horizontal. According to the invention, the pivoting is controlled by an actuating drive 28 disposed e.g. between the headlamp lug 22 and the vehicle body 18. In the embodiment shown in FIG. 1 the drive facility 28 takes the form of an electromagnet 30 whose two constituent parts (not shown), movable relatively to one another, are rigidly secured the one to lug 22 and the other to the body 18 so as to be able to move the lug 22 rearwardly beyond the abutment 20 when an energizing voltage U is applied to electromagnet terminals 32, 34. The rearwards movement of the lug 22 — i.e., the travel of the drive 28 — is limited to a value such that the resulting pivoting of axis X around axis Y raises axis X by approximately 0.01 radian or 35 angle minutes relatively to the horizontal. If the axis Y is horizontal, the raisiing of axis X corresponds exactly to its angle of pivoting. If axis Y is skewed, e.g. inclined at 45° to the horizontal (calculated clock-wise when facing the headlamp lens), a 0.014 radian movement of the optical axis X results in an angular shift of 0.01 radian upwards and 0.01 radian towards the left-hand side of the driver, for a right hand drive vehicle.

Of course, if the lug 22 is adapted to abut the electromagnet element which is secured (adjustably) to the body 18, the electromagnet 30 can provide the function of the abutment 20.

Figure 2:
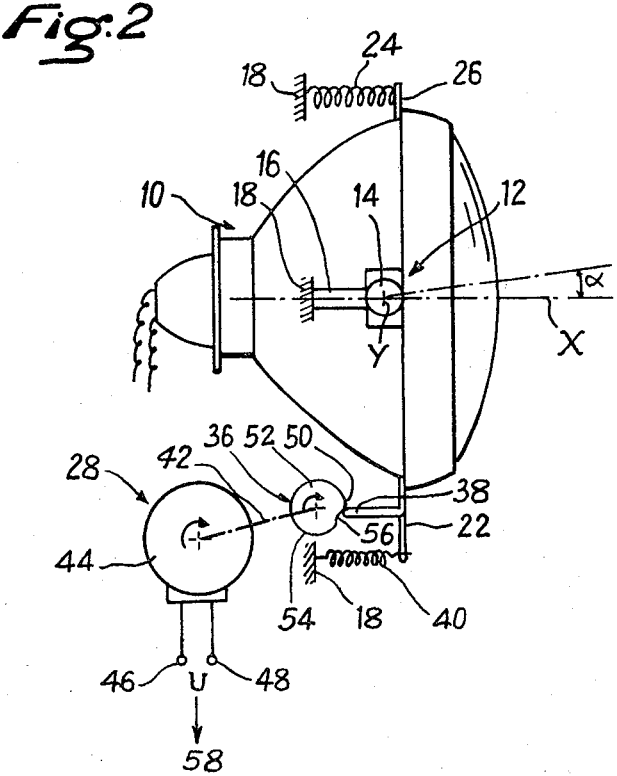
FIG. 2 is a diagrammatic view in elevation similar to FIG. 1 and showing another embodiment of an adjusting mechanism according to the invention.

Referring to FIG. 2, the drive 28 takes the form of a cam 36 cooperating with an abutmment element 38 rigidly secured to a lug, such as the lug 22, secured to headlamp 10. The abutting realtionship between the element 38 and the cam 36 (in a predetermined position thereof), taken together with the systems 12, is sufficient to determine the normal headlamp position subject to the provision of appropriate restoring means, such as a spring 40, for keeping the element 38 in engagement with the camming surface of the cam 36. As an alternative to the spring 40, the headlamp 10 can be overhung-mounted or else the spring 24 can act as restoring means if the cam 36 is positioned appropriately.

The cam 36 is connected by a shaft 42 or similar transmission means to an electric motor 44 which, when energized at its terminals 46 and 48 with a voltage U, can rotate the cam 36 fairly fast. Advantageously, the motor 44 is associated with a limit switch (not shown) for interrupting the energization U upon completion by the shaft 42 of one complete revolution.

In this event, when the motor 44 is energized the cam 36 is bound to return at the end of its movement exactly to its initial position as defined by the limit switch.

The profile of the cam 36 is such as to produce a rapid movement, right from the start of the cam movement, of the optical axis X around the pivot axis Y through an angle corresponding to an approximately 0.01 radian raising of the axis X, with or without a 0.01 radian leftwards movement. The cam 36 has a corresponding relatively steep initial portion 50. Thereafter the cam 36 can have a substantially circular portion 52 which is centred on the cam axis, so that over the whole length of the part 52 the cam 36 maintains the headlamp 10 with its optical axis X in the raised position just described. The portion 52 is followed by a portion 54 which extends towards the cam axis and merges into the initial bearing portion 56 so as progressively to bring the optical axis X back into its original orientation. The motor 44 runs at a speed such that the cam 36 takes approximately 3 or 4 seconds to make one complete revolution.

In a third arrangement (not shown) the headlamp 10 is placed under an automatic control adapted to modify beam setting in dependence upon variations in vehicle attitude; in this event the headlamps are moved not in the region of the lug 22 but at any place in the control circuit or by means of an electric motor or electromagnet or of any other system.

In the embodiments hereinbefore described there is a purley mechanical connection between the moving element of the drive 28 and the headlamp 10, but any other kind of connection, such as a hydraulic connection between two associated reciprocating actuators, one of which is associated with the drive 28 and the other with the or each headlamp, can be considered.

The voltage U for energizing the drive 28 (electromagnet 30 or cam 36) is provided, in the adjusting system according to the invention, by a delay facility (FIG. 5) which can provide the voltage U for a brief period, e.g., of from approximately 3 to 4 seconds, after extinction of the main beam.

Figure 5:
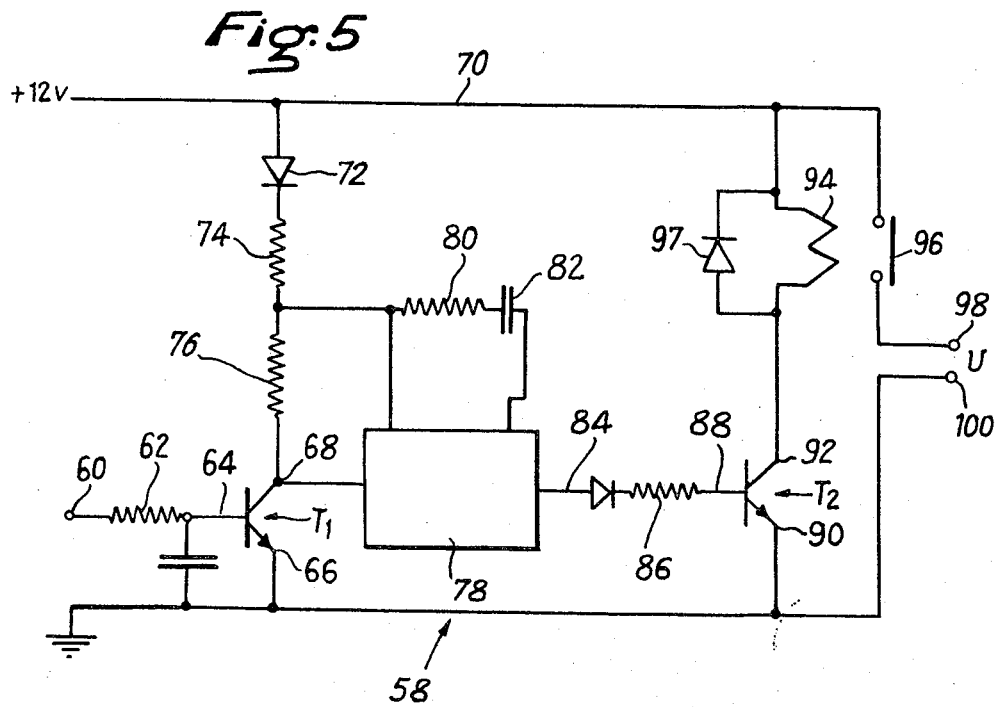
FIG. 5 shows a circuit providing a delay facility in the adjusting system according to the invention.

FIG. 5 shows one possible embodiment for such a delay facility 28. The circuit embodying the facility 58 has a control terminal 60 for connection to the electrical control circuit (not shown) available to the vehicle driver to produce either main-beam or dipped-beam lighting. The connection is such that extinguishing the main beam causes the voltage V at terminal 60 to change from a given value, e.g., 12 volts, to 0. The voltage V is applied through a surge limiter 62 to the base 64 of a transistor $T_1$ whose grounded 66 is earthed and whose collector 68 is connected to a 12-volt d.c. supply line 70, e.g., through a protective diode 72 and two biasing resistances 74, 76. The voltage of the collector 68 is applied to an electronic monostable multivibrator 78 of any appropriate kind such that the appearance of a voltage at the collector 68 brings the monostable multivibrator 78 into the 1 state. Zero resetting of monostable multivibrator 78 with appropriate delay is the responsibility of a resistance-capacity circuit 80–82. When the monostable multivibrator 78 changes its state, a pulse whose duration depends upon the time constant of the circuit 80–82 appears at 84. The circuit 80–82 is adjusted so that the pulse lasts about 4 seconds. The voltage at 84 is applied through a resistance 86 to the base 88 of a second transistor $T_2$ whose emitter 90 is grounded and whose collector 92 is connected to the supply line 70 through the winding 94 of a relay. A freewheel diode 97 is connected across winding 94 in conventional manner. When relay contacts 96 close, a voltage U of, in the present case, 12 volts appears between terminals 98 and 100.

The delay facility 58 just described operates as follows:

When the headlamp is on main beam, the voltage V at terminal 60 has a given value of e.g. 12 volts. Transistor T1 is conductive, and so the voltage at 68 is 0. When the main beam is extinguished, the voltage V at terminal 60 drops to 0 (terminal 60 is disconnected). Transistor T1 cuts off and a voltage substantially equal to the voltage of the supply line 70 — i.e., of 12 volts — appears at 68.

Monostable multivibrator 78 is brought to the one state, then returned to the 0 state with a delay determined by the time constant of the RC circuit 80–82. The pulse appearing at the base of transistor T2 causes relay 96 to close and thus leads to the appearance between terminals 98 and 100 of a voltage U which lasts for a predetermined time corresponding to the length of the pulse — i.e., 4 seconds.

Application of the voltage U under the control of the delay facility 58 to the terminals 32, 34 of the electromagnet 30 or to the terminals 46, 48 of motor 44 causes a brief alteration in the direction of the headlamp optical axis X as compared with its normal direction determined by the headlamp mounting on the vehicle body.

As a variant of the delay facility 58 hereinbefore described when the drive takes the form of the electromagnet 30, it is possible to use a conventional differentiating electric circuit which can produce a voltage pulse in response to extinction of the main beam, and some form of damping, e.g. a dashpot, for damping the return of the headlamp 10 back to its normal position from the position into which it has risen as a result of the electromagnet being energized by the voltage pulse.

When the drive takes the form of the cam 36, drive motor 44 and limit switch, a delay facility can be provided in the form of a differentiating circuit as just defined an of a stick relay which can keep the required voltage applied to the motor terminals 46 and 48 (of course until the limit switch operates).

In general, it will be apparent that the adjustment provided by the invention resides basically in a form of providing a brief alteration in the normal position of the headlamp 10 such that there is a slight upwards and possibly leftwards movement of the headlamp optical axis X when the vehicle driver changes over from main-beam to dipped-beam lighting (the dipped-beam lighting being provided at least to some extent by the headlamp 10). The actuation basically comprises a drive (28) of any known kind which can produce a slight angular movement of headlamp 10 around an axis Y which is at an angle of from 0 to 90° to the horizontal, plus a delay facility (58) which can either damp the return of the headlamp to its normal position or maintain the headlamp in its deflected position for a duration of a few seconds.

Figure 3:
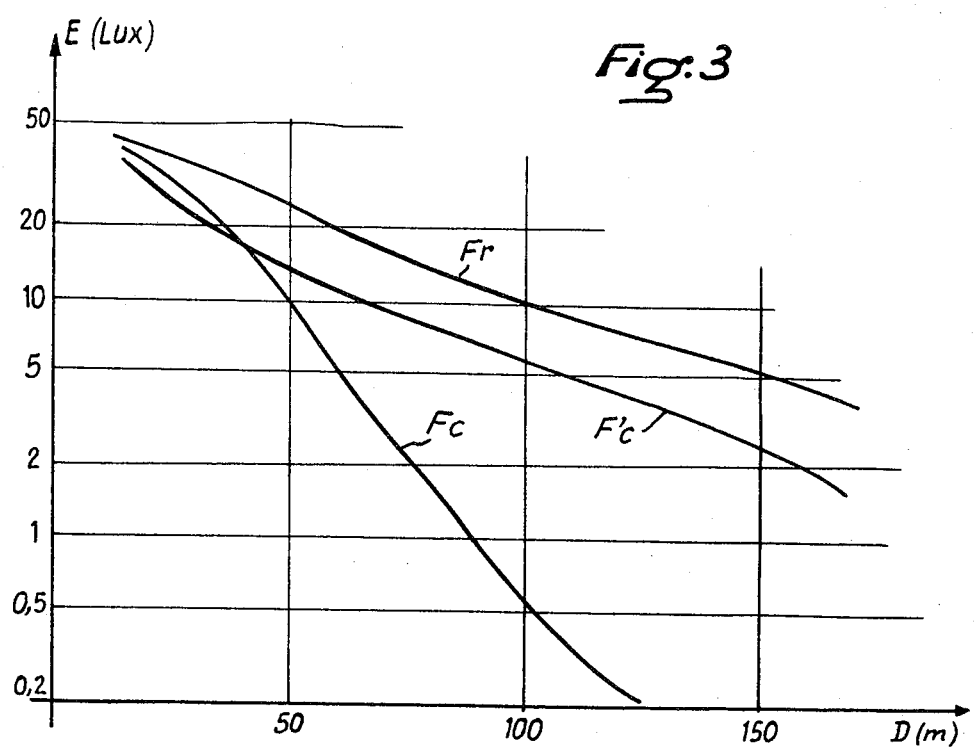
FIG. 3 is a graph showing the variation in road illumination in dependence upon distance which can be provided by the various forms of lighting made possible by the system according to the invention.

The curves shown in FIGS. 3 and 4 are helpful in understanding the usefulness of the adjusting system hereinbefore described.

In FIG. 3 curves $R_r$ and $F_c$ represent the illumination L (measured in Lux) of the road, plotted against the distance D in meters ahead of the vehicle, in the case of the main beam ($F_r$) and of the dipped beam ($F_c$). The curves show, for instance, that the ratios between main-beam illumination and dipped-beam illumination are of the order of 1 to 2 at a distance D of 50 meters and of the order of 1 to 4 at a distance D of 70 meters. It is also apparent that in optimum conditions dipped-beam range is limited to somewhere between 70 and 100 meters. In practice the maximum visibility range is around 70 to 80 meters.

These illumination ratios show up even more clearly in FIG. 4 where each curve A, B and C is a dipped-beam/main-beam isoratio curve — i.e., all those places of the road such that the dipped-beam illumination is in a given relationship $I_r$ with the main-beam illumination. These curves show the isoratios on the line extending straight ahead (line 0) and for distances (shown on the horizontal scale) to left and right of the line 0. The ratio $I_r$ is 0.5 for curve A, 0.25 for curve B and 0.1 for curve C.

Consequently, when the driver changes from main beam to dipped beam, illumination along the headlamp axis is halved at 50 meters and quartered at 70 meters. Such a sharp reduction in illumination explains the appearance of the black spot or patch, hereinbefore mentioned, on the road somewhere between 50 and 150 meters ahead of the vehicle.

The invention proposes a brief upwards and possibly leftwards "de-setting" of the dipped beam by means of the adjusting system hereinbefore described, basically to obviate any such black spot or patch.

The results produced by a 0.01 radian upwards shift and a 0.01 radian leftwards shift of the optical axis of the headlamp producing the dipped beam are respresented by the curve $F'_c$ in FIG. 3 and the curves A' and B' in FIG. 4.

A study of the curve $F'_c$ in FIG. 3 will show that the headlamp movement has shifted the intensely illuminated zone associated with the dipped beam to between approximately 100 and 200 meters.

The curve A' of isoratio $I_r = 0.5$ between defelected dipped-beam/illumination main beam illumination shows that the driver's visibility range is at least 150 meters, for it is fair to assume that a 50% reduction in illumination of the road ahead is unlikely to worry drivers.

The time for which the headlamp is at least to some extent deflected from its normal position is devised so as not to worry the drivers of oncoming vehicles. On the assumption that the deflected dipped beam does not worry the driver of an oncoming vehicle at vehicle separations of more than 200 meters, calculations show that with a headlamp deflection lasting 4 seconds the adjusting system according to the invention can be used when the two vehicles are further apart from one another than 400 meters and each travelling at approximately 100 km/h. As a general rule, headlamps are dipped when the vehicles are more than 1000 meters apart from one another, and so a beam deflection time of from 3 to 5 seconds is completely satisfactory.

When headlamps are dipped at a distance of less than 200 meters the system using this invention must be rendered inoperative either by the driver or automatically under the control of a photo-sensitive element which can detect the illumination provided by the oncoming vehicle and, for instance, interrupt the relay supply circuit upon such illumination exceeding a critical level.

This invention is not of course limited to the embodiment hereinbefore described and shown and many modifications are possible without departing from the scope of the Application. More particularly, the adjusting system is equally well of use for two dipped headlamps of the vehicle and for just one of such headlamps, such as more particularly the right-hand headlamp.

What I claim as my invention and desire to secure by Letters Patent is:

1. A motor vehicle headlight system comprising:
   a. main light beam producing means and dipped light beam producing means,
   b. said dipped light beam producing means including a headlight having a normal position and mounted for pivotal movement about a non-vertical axis,
   c. electrical drive means for pivoting said headlight out of its normal position to slightly raise the dipped light beam emanating therefrom,
   d. means for simultaneously extinguishing said main light beam producing means and turning on said dipped light beam producing means,
   e. means responsive to operation of said means (d) for providing an electrical signal of limited duration to said drive means to energize the latter and pivot said headlight out of its normal position, and
   f. means automatically returning said headlight to its normal position after operation of said drive means.

2. A motor vehicle headlight system as defined in claim 1 wherein said returning means (f) comprises resilient means which is stressed when said headlight is pivoted out of its normal position.

3. A motor vehicle headlight system according to claim 1 including means for limiting the rate of return movement of said headlight from its raised position to its normal position.

4. A motor vehicle headlight system according to claim 3, in which said means for limiting the rate or return movement of said headlight comprises a damping device.

5. A motor vehicle headlight system according to claim 1, in which said drive means includes an electromagnet whose energization is controlled by said electrical signal.

6. A motor vehicle headlight system according to claim 5 including a damping device adapted to dampen the return movement of the headlight back to its normal position.

7. A motor vehicle headlight system according to claim 1, in which said drive means includes an electric motor, cam means arranged to be rotated by said motor, and an abutment element connected to said headlight engaging said cam means.

8. A motor vehicle headlight system according to claim 7, in which said cam means includes a first portion shaped to quickly move the headlamp to its raised position upon energization of the motor, and a second portion shaped to limit the rate of return movement of the headlamp back to its normal position.

9. A motor vehicle headlight system according to claim 8, in which said means (e) includes a relay for controlling energization of the electric motor in response to said electrical signal, and a limit switch for shutting off the motor energization once the headlight returns to its normal position.

10. A motor vehicle headlight system according to claim 1, in which said means (e) includes a monostable multivibrator brought to the 1 state by operation of said means (d), a resistance-capacitance circuit to restore the monostable multivibrator to the 0 state after a delay, and a relay responsive to the operation of the monostable multivibrator to control operation of the drive means.

11. A motor vehicle headlight system according to claim 1, in which the drive means produce a movement of the headlight to cause an approximately 0.01 radian reduction of the inclination of its optical axis relative to the horizontal.

* * * * *